Dec. 27, 1966 D. A. NEILSON 3,295,102

DIGITAL COMPUTER HAVING A HIGH SPEED TABLE LOOK-UP OPERATION

Filed July 27, 1964

3,295,102

DIGITAL COMPUTER HAVING A HIGH SPEED TABLE LOOK-UP OPERATION

Dan Allan Neilson, North Palm Beach, Fla., assignor to Burroughs Corporation, Detroit, Mich., a corporation of Michigan Filed July 27, 1964, Ser. No. 385,157
5 Claims. (Cl. 340—146.2)

Figures 1, 2:
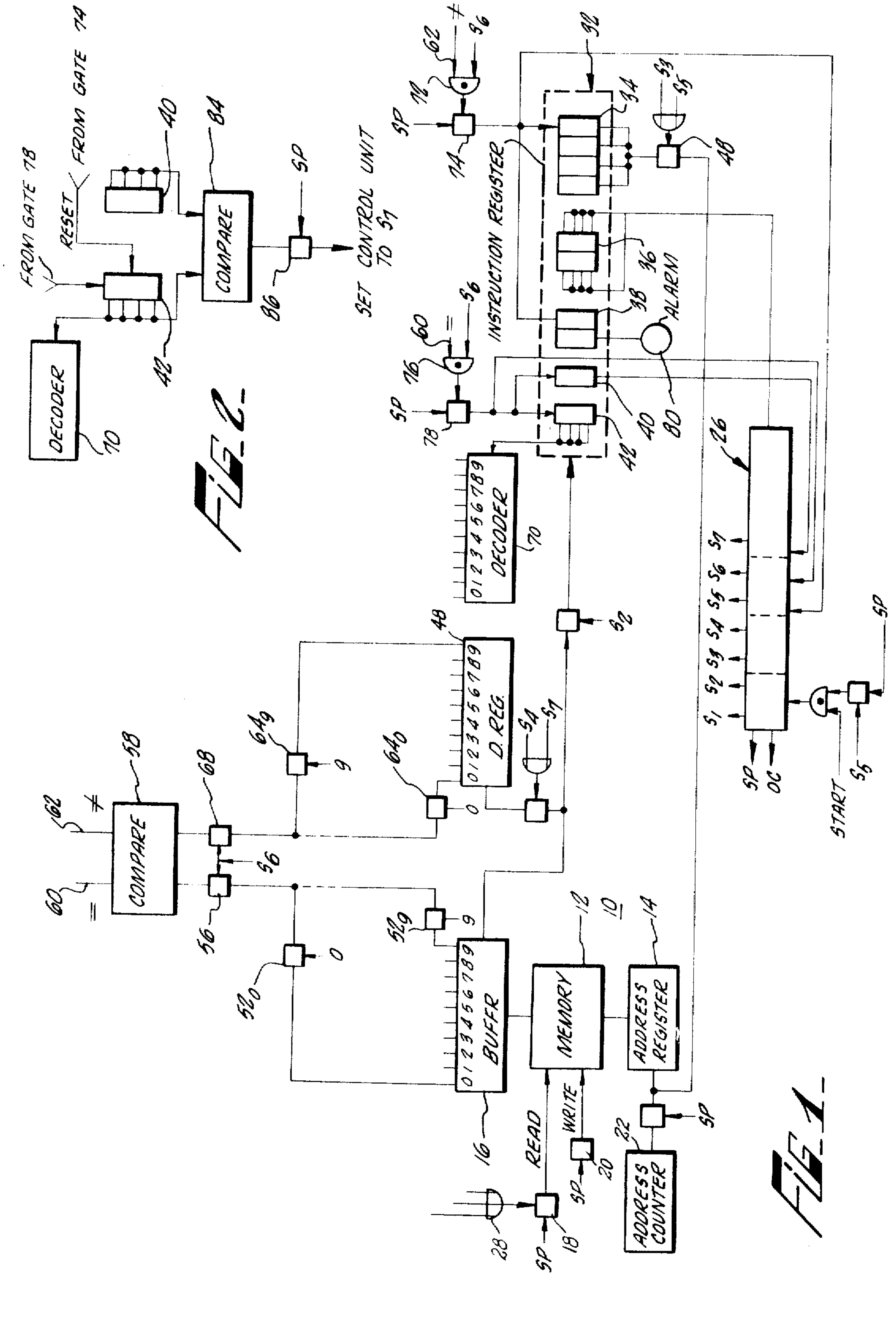

This invention relates to digital computers and, more particularly, to a digital computer incorporating a high speed table look-up operation.

It is frequently desirable in operating a digital computer to be able to scan through a table of stored data, such as constants, a series of accounts, or the like. This has been accomplished in the past by programming the computer to bring out a word from the table, do a comparison operation between a portion of the word brought out of memory and a reference number. When a comparison resulted, an address was available for locating the desired information in the table. The desired information might be part of the same word located by the comparison procedure or it might be a word stored in memory at some other address identified by a portion of the word located by the comparison procedure. In any event, a series of instructions were necessary to make the comparison on each word in the table and this sequence of instructions had to be repeated over and over again until a comparison was made. Furthermore, such comparison operation was performed on the entire word or selected portion of the entire word for each word in the table until an "equal" comparison was made. Usually the adder of the arithmetic unit is used to do the comparison. If a serial adder is employed, the comparison is time consuming in that a comparison between all the digits of each word in the table is required for each comparison operation. While a parallel adder can provide a much higher speed comparison operation, parallel circuits are relatively expensive.

The present invention is directed to a computer incorporating a single instruction for effecting the above-described table look-up operation. The single instruction, of course, reduces the problem of the programmer and materially reduces the operation time since the number of fetch and execute cycles is reduced to one for the entire look-up operation. Moreover, the present invention provides a simplified comparison in which a comparison is made on only one digit of a word from the table at a time, and if an "equal" comparison is not made, a comparison is made on a selected digit of the next word in the table. The necessity of making a comparison on every digit or character in every word in the table is avoided, thus greatly speeding up the comparison operation.

The advantages of the present invention are provided by a digital processor in which, in response to a single table look-up instruction, a comparison is made between the highest order digit of each word read out in sequence from the selected table stored in memory with the highest order digit of a reference word with which a comparison is sought. The comparison is made only on the highest order digit until a word is read out from the table on which a comparison of equality between the two highest order digits is effected. Comparison then continues between the next to highest order digit of the reference word and the remaining words in sequence in the table in memory. Every time an "equal" comparison is noted, operation continues on the next lower order digit of the same word from the table. A counter is provided which is set by the instruction for determining when a predetermined number of orders of digits have been compared and equality noted. When the counter indicates that equality exists between a predetermined number of digits of a word from the table and the reference word, the desired word position has been located in the table in the memory.

For a more complete understanding of the invention, reference should be made to the accompanying drawing wherein:

FIGURE 1 is a block schematic diagram of one embodiment of the present invention; and FIGURE 2 is a block schematic diagram of a modification to the circuit arrangement of FIGURE 1.

By way of example only, the preferred embodiment of the invention as shown in FIGURE 1 is described as it would be incorporated in a computer of the type described in Patent No. 3,001,708 which is a serial type of digital computer in which information is represented in a binary-coded decimal form according to a one-two-four-eight code. This is a conventional code and requires four flip-flops to store four bits representing one decimal digit. The four flip-flops which store one digit are referred to as a decade. Further, it is assumed that all information is stored in the form of words, the standard word length being, for example, ten digits plus sign. The digits comprising the words are generally circulated serially a digit at a time by transferring simultaneously the four bits representing a digit in parallel from one decade to another. Words circulated in the computer are generally of two types, namely, operands and instructions. The instructions have designated digits which represent the order to be executed, such as the order to execute an add cycle, a multiply cycle or the like. Other designated digits in the instruction word represent the address in memory associated with the instruction, such as the address of an operand to be used in an add operation, etc.

With these general principles of operation in mind, reference may be made to the details of FIGURE 1 in which the numeral 10 indicates generally the memory portion of the computer in which instructions and operand words are stored. The memory 10 may be a random access core memory and includes a core memory circuit 12 which comprises a coincidence core matrix circuit and suitable driver and sensing circuits. Associated with the core memory circuit 12 is an address buffer register 14 and an information buffer register 16. The address register 14, for example, may include four decades for storing the digits designating an address location in memory. The buffer register 16 includes eleven decades for storing one complete word to be written into memory or which has been read out of memory. A pulse passed by a gate 18 causes a word to be read from the address designated by the digits in the address register 14 from the memory 12 into the buffer register 16. A pulse passed by the gate 20, on the other hand, causes the word in the buffer register 16 to be written into the memory 12 at the address location identified by the address register 14.

Instructions are generally brought from the core memory 12 in sequence by means of an address counter 22. The address counter is normally advanced by a single count each time a new instruction is brought out of memory. The contents of the address counter, at the beginning of a fetch operation for bringing out a new instruction, is transferred by means of a gate 24 to the address register 14. This operation as well as all other operations of the computer are under the control of a central control circuit indicated generally at 26.

The central control circuit is described more fully in the above-identified patent, but in general it includes a clock pulse source and a sequence counter which advances through a series of steps. Associated logic circuit provides high levels on output lines from the central control unit corresponding to each particular step through which the central control unit is sequenced. A sequence pulse SP is generated each time the central control unit advances from one state to the next. Initially, the central control unit is in the state providing a high level on the output line designated $S_1$. This is the initial state of the central control unit.

The $S_1$ level is applied to the gate 24 permitting the contents of the address counter 22 to be transferred to the address register 14. The SP generated at the end of the $S_1$ state is applied through a gate 27 at the end of the $S_1$ state to advance the address counter 22 by one. The same SP is passed by the gate 18 to which the $S_1$ state is applied through a logical "or" circuit 28. As a result, at the end of the $S_1$ state, the selected instruction is transferred from the memory 12 to the buffer register 16. At the same time, the central control unit 26 advances to the next state providing a high level on the output line designated $S_2$.

During the $S_2$ state, the instruction word in the buffer register 16 is transferred by means of a gate 30 to an instruction register 32. The four digits constituting the address are stored in the four decades indicated at 34. The two digits representing the order are stored in two decades indicated at 36. The remaining four digits of the instruction word are stored respectively in a pair of decades 38, a decade 40 and a decade 42.

Once the instruction is transferred to the instruction register 32, the order digits in the decades 36 are applied to the central unit 26 where the order digits are decoded and used to control the central control unit 26. The central control unit then advances through a series of states which are required to carry out the sub-operations needed to implement the instruction. For example, the manner in which an addition is performed is described in detail in the above-identified patent.

In connection with the present invention, it is desirable that a word be placed in a register on which a comparison can be made in doing a table look-up operation. The comparison is done on a word stored in a register 46 called the D-register. When an instruction is encountered which calls for loading of the D-register 46 with the contents from a specified address location in the memory 12, the central control unit 26, in response to the contents of the order digits in the decades 36, advances to the $S_3$ state. During the $S_3$ state, a gate 48 is opened to transfer the address in the address portion 34 of the instruction register 32 to the address register 14. The contents of the corresponding address are transferred from the memory 12 to the buffer register 16 by applying the $S_3$ state to the logical "or" circuit 28 so that the SP at the end of the $S_3$ state causes a read out of the memory 12. The central control unit then advances to the $S_4$ state during which a gate 50 is opened coupling the output of the buffer register 16 to the D-register 46. At the end of the $S_4$ state, an OC pulse is generated by the control unit, indicating that the operation is complete. The OC pulse is used to reset the control unit back to the $S_1$ state and to reset or clear any flip-flops or registers in the computers which should be reset at this point.

The fetch cycle provided by the central control unit 26 in the $S_1$ and $S_2$ states is again repeated and the next instruction brought into the instruction register 32. For the purpose of describing the present invention, it will be assumed that this instruction now calls for a table look-up operation in which a sequence of words in memory are scanned to find words in which selected digits compare equally with selected digits in the reference word stored in the D-register 46. The table look-up instruction, in addition to the operator digits in the decades 36, includes the address in the decades 34 designating the position of the first word in the table in memory. The decades 38 designate the number of words in the table. The decade 40 contains a digit designating the number of digits in the word on which a comparison is to be made and the decade 42 contains a digit designating the order position of the most significant digit in the word on which a comparison is to be made. For example, a nine indicates the comparison field is to start with the highest order digit, an eight indicates that the comparison field is to start on the next to highest order digit, etc.

Assuming that the operation code in the decades 36 calls for a table look-up instruction, the central control unit 26 decodes the contents of the decoder 36 and in response thereto is advanced from the $S_2$ state at the completion of the fetch operation to the $S_5$ state. During the $S_5$ state, the contents of the decades 34 is transferred through the gate 48 to the address register 14. At the end of the $S_5$ state, as applied to the gate 18, the first word in the table is read out from the memory 12 into the buffer register 16 from the designated address. A comparison is now made between selected digits in the word in the buffer register 16 and the word in the D-register 46. To this end, each of the decades of the buffer register 16 is connected to a corresponding gate, such as indicated at $52_0$ through $52_9$. It should be noted that there are ten decades in the register 16 corresponding to the ten digits of the word. These are number 0 through 9 going from the least significant to the most significant digit of the word. The gate $52_0$ is connected to the 0 decade and the gate $52_9$ is connected to the 9 decade. The remaining gates connected to the other decades are not shown in the figure in the interest of simplifying the drawing, but it will be understood that there is one gate for each decade in the buffer register 16. The outputs of all the gates are connected to a gate 56, the output of which is connected to one side of a comparison circuit 58, which may, for example, be of a type circuit described in U.S. Patent No. 2,885,655. The comparison circuit is arranged to compare two binary coded decimal digits and to provide one of two output signals; an output signal on the line 60 indicates that the two digits are equal and an output signal on the line 62 indicates that the two digits are unequal.

Similarly, each of the decades of the D-register 46 is connected through a corresponding gate, two of which are indicated at $64_0$ through $64_9$. The output of these gates are connected to the input of a gate 68 to the other input of the comparison circuit 58.

As pointed out above, the decade 42 in the instruction register 32 contains a digit designating the highest order digit in the word being compared. It is assumed that the most significant digit decade is 9 and the least significant digit decade is 0 in the registers 16 and 46. Thus if the decade 42 contains a 9, a comparison is made starting with the highest order digit in the word stored in the buffer register and the D-register 46. The output of the decade 42 is connected to a decoder 70 which provides a high level on one of ten output lines depending upon the decimal value of the digits stored in the decade 42. The 0 output line from the decoder is connected to the gate 52 and the gate 64. The corresponding output lines from the decoder 70 are similarly connected to others of the two groups of gates. Thus depending upon the initial digit stored in the decade 42, a selected one of the digits in the buffer register 16 and the D-register 46 are gated respectively to the input of the gates 56 and 68.

When the central control unit 26 advances from the $S_5$ state in which the first word in the table is read out of the memory 12 into the buffer register 16, it advances to the $S_6$ state. The $S_6$ state is applied to the gates 56 and 68 so that during the $S_6$ state, a comparison is made between the selected digits in the word stored in the buffer register 16 and the word stored in the D-register 46. If it is assumed that these digits are not equal, a signal will be provided on the output line 62 from the comparison circuit 58. The output line 62 is coupled through a logical "or" gate 72. The gate 74 passes the next SP at the conclusion of the $S_6$ state to advance the address in the decades 34 by one and to count down the value of the digits stored in the decades 38. It also resets the control unit 26 to the $S_5$ state.

The above-described operation is now repeated on the next word in the consecutive table of words stored in the memory 12. The operation is repeated over and over until a word is found in the table in which the selected digit is equal to the corresponding digit in the word stored in the D-register 46. At this point, during the $S_6$ state, the comparison circuit 58 will generate a signal on the output line 60, providing an indication that the two digits being compared are equal. The output line 60 together with the $S_6$ state is applied to a logical "and" circuit 76, the output of which opens a gate 78 for passing the SP generated at the end of the $S_6$ state. This pulse from the output of the gate 78 decrements the decades 40 and 42. At the same time, the pulse from the output of the gate 78 resets the control unit 26 to the $S_6$ state.

By decrementing the decade 42, the output of the decoder 70 now is set to the next lower order digit in the two words being prepared in the buffer register 16 and the D-register 46. In this manner, whenever the digits are not equal, a new word is brought out from the table and whenever an equal comparison does exist, a comparison is made on the next lower order of digits in the words in the two registers.

This continues until the decade 40 is counted down or decremented to zero at which time it generates an overflow pulse which advances the central control unit 26 to the $S_7$ state. If it is assumed that the words in the table are always in ascending order of magnitude, it is now known that selected digits of the word in the buffer register 16 and the D-register 46 are all equal. At this point, it may be desirable to store the selected word in the table in the D-register 46. To this end, the $S_7$ state is applied to the gate 50 whereby the word from the table now in the buffer register 16 is placed in the D-register 46 where it is available for subsequent use in the computer. Alternatively, it may be desirable to merely store the address now contained in the address register 14 for future reference in some predetermined location in the memory 12. This is a matter of choice and it is not an essential aspect of the present invention. The significant factor is that a selected word in a table has been located in memory, and the location of this word has been accomplished automatically by a single instruction. Furthermore, the location requires only the comparison of one pair of digits at a time rather than requiring a comparison on all the digits for each word in the table read out of the memory 12.

If no comparison is obtained after reaching the end of the table, the decades 38 will be counted down to zero and an overflow pulse will be generated which can be used to operate an alarm device 80 which indicates that the desired word is not present in the table. On the other hand, if the desired comparison is made, at the end of the $S_7$ state the control unit 26 generates an OC and returns to the $S_1$ state to fetch the next instruction.

If it is assumed that the words in the table are not necessarily in any particular order, the modification shown in FIGURE 2 may be employed. In using the modification of FIGURE 2, it is assumed that a comparison always starts with the most significant digit of the word and that the most significant digit is the digit in the zero decade of the buffer register 16 and the D-register 46. Thus the decade 42 will normally be loaded with a zero by the instruction and the decade 40 will be loaded with the number of digits on which a comparison is to be made.

In the modification of FIGURE 2, the decade 42 is reset to zero by the output from the gate 74. At the same time, the decade 40 is not counted down but remains at the value indicating the number of digits on which a comparison is to be made. Both the condition of the decade 40 and the decade 42 are applied to a comparison circuit 84, which may be the same type of circuit as the comparison circuit 58 and the equal output of which is coupled through a gate 86 to the central unit 26 to set it to the $S_7$ state. Thus when the comparison circuit 84 indicates equality between the quantity in the decades 40 and 42, the gate 86 passes the next SP to advance the control unit 26.

With the arrangement of FIGURE 2, it will be noted that every time a new word is brought into the buffer register 16 from the table in memory, a comparison is repeated starting with the highest order digit but the comparison ceases as soon as the comparison circuit 58 finds any equality between a corresponding digit in the word in the buffer register 16 and the word in the D-register 46. For this reason, the modification of FIGURE 2 does not require that the words be in ascending order and yet the circuit of FIGURE 2 has the advantage that a comparison does not have to be made on all the selected digits of each word in the table.

While the invention has been described in connection with a table look-up instruction involving a table stored in the memory 12, it will be evident to one skilled in the art that the same table look-up comparison technique could be applied to information stored in other types of memory devices than in a core memory. Also the invention may be used with a character mode processor rather than a word mode processor. The important feature of applicant's invention is that a comparison is done digit by digit starting with the most significant digit, and the comparison on any given word is interrupted whenever an unequal condition between a particular digit position of the two words being compared is encountered. This effects an economy in time and circuitry over systems in which a comparison is made between two words by comparing all the digits of each word.

What is claimed is:

1. Apparatus for searching for a selected word in a digital storage unit in which words are stored in addressable storage positions, said apparatus comprising a first register for storing digitally coded instructions, a second register for storing a word from memory, means responsive to a first coded instruction in the first register for storing a selected word from the storage unit in the second register, a digit comparator for generating signals indicating equality or inequality between two electrically coded digits coupled thereto, means responsive to a second coded instruction in the first register for reading out a selected word from the storage unit and applying a first digit of the selected word to the comparator, means responsive to said second coded instruction for applying a first digit of the word in the second register to the comparator, means responsive to a signal from the comparator indicating the digits are unequal for reading out the next word in sequence from the storage unit and applying the first digit to the comparator, means responsive to a signal from the comparator indicating the digits are equal for applying a second digit from the word in the second register to the comparator together with the next lower order digit of the same selected word from the memory unit, means actuated by the generation of a comparator signal indicating equality for counting the number of pairs of digits on which an equal indication is generated by the comparator, and means responsive to the counting means for generating a signal when a predetermined number of digits in the word in the second register are equal to a corresponding number of digits in a word read out of the memory unit.

2. Apparatus for searching for a selected word in a digital storage unit in which words are stored in addressable storage positions, said apparatus comprising a first register for storing digitally coded instructions, a second register for storing a word, a digit comparator for generating signals, indicating equality or inequality between two electrically coded digits coupled thereto, means responsive to a coded instruction in the first register for reading out a selected word from the storage unit and applying a first digit of the selected word to the comparator, means responsive to said coded instruction for applying a first digit of the word in the second register to the comparator, means responsive to a signal from the comparator indicating the digits are unequal for reading out the next word in sequence from the storage unit and applying the first digit to the comparator, means responsive to a signal from the comparator indicating the digits are equal for applying a second digit from the word in the second register to the comparator together with the next lower order digit of the same selected word from the memory unit, means actuated by the generation of a comparator signal indicating equality for counting the number of pairs of digits on which an equal indication is generated by the comparator, and means responsive to the counting means for generating a signal indicating when a predetermined number of digits in the word in the second register are equal to a corresponding number of digits in a word read out of the memory unit.

3. Apparatus for searching for a selected word in a digital storage unit in which words are stored in addressable storage positions, said apparatus comprising a register for storing a word, a digit comparator for generating signals indicating equality or inequality between two electrically coded digits coupled thereto, means for reading out a selected word from the storage unit and applying a first digit of the selected word to the comparator, means for applying a first digit of the word in the register to the comparator, means responsive to a signal from the comparator indicating the digits are unequal for reading out the next word in sequence from the storage unit and applying the first digit to the comparator, means responsive to a signal from the comparator indicating the digits are equal for applying a second digit from the word in the register to the comparator together with the next lower order digit of the same selected word from the memory unit, means actuated by the generation of a comparator signal indicating equality for counting the number of pairs of digits on which an equal indication is generated by the comparator, and means responsive to the counting means for generating a signal indicating when a predetermined number of digits in the word in the register are equal to a corresponding number of digits in a word read out of the memory unit.

4. In a processor having a table lock-up instruction for finding the location of a word stored as part of a table of words in memory and having a predetermined group of digits in the word, apparatus comprising a register for storing said predetermined group of digits, comparison means for generating signals indicating equality or inequality between two electrically coded digits applied thereto, means including a first counter for addressing words in the table in memory in sequence, means including a second counter for selecting a particular order of digit in each word addressed in memory, said means coupling the digit to the comparison means, means responsive to the second counter for selecting a corresponding order of digit from the register and coupling the digit to the comparison means, means responsive to a signal from the comparison means indicating inequality for counting the first counter and activating means for addressing the next word in the table in memory, means responsive to a signal from the comparison means indicating equality for counting the second counter to provide a comparison of the next order of digit in the same word from memory and the next order digit in the register, and means sensing when the second counter reaches a predetermined count condition and an equality signal is generated for generating a signal indicating the comparison is complete.

5. Apparatus as defined in claim 4 further including means responsive to the signal from the comparison indicating inequality for resetting the second counter to its initial count condition, whereby the comparison is repeated starting with the first digit of the next word in the table of words in memory.

References Cited by the Examiner

UNITED STATES PATENTS

| | | | |
|---|---|---|---|
| 3,107,339 | 10/1963 | Day et al. | 340—146.2 |
| 3,197,742 | 7/1965 | Rettig et al. | 340—146.2 X |
| 3,218,609 | 11/1965 | Shaw | 235—177 X |

MALCOLM A. MORRISON, *Primary Examiner.*

M. P. HARTMAN, *Assistant Examiner.*